United States Patent

[11] 3,596,520

| [72] | Inventor | Philip H. Sanford |
| | | Walpole, Mass. |
| [21] | Appl. No. | 847,080 |
| [22] | Filed | Aug. 4, 1969 |
| [45] | Patented | Aug. 3, 1971 |
| [73] | Assignee | The Foxboro Company |
| | | Foxboro, Mass. |

[54] SPRING COMPENSATED DIFFERENTIAL PRESSURE CELL
14 Claims, 7 Drawing Figs.

[52] U.S. Cl. .................................................. 73/407, 73/393, 92/49
[51] Int. Cl. .................................................. G01l 7/08
[50] Field of Search .................................................. 73/407, 393; 92/49, 97, 1

[56] References Cited
UNITED STATES PATENTS

| 1,910,322 | 5/1933 | Coffin et al. .................. | 92/97 X |
| 2,627,183 | 2/1953 | Greenwood, Jr.; et al. .... | 73/393 |
| 2,627,750 | 2/1953 | Titus ............................... | 73/407 |
| 3,073,348 | 1/1963 | Allen .............................. | 73/407 X |
| 3,116,918 | 1/1964 | Francis .......................... | 92/49 |
| 3,492,872 | 2/1970 | Caspar et al. ................. | 73/407 |

Primary Examiner—Louis R. Prince
Assistant Examiner—Daniel M. Yasich
Attorney—Lawrence H. Poeton ABSTRACT: A differential fluid pressure capsule. The capsule has a chamber with diaphragms as opposite walls. The diaphragms have different effective areas, one large, one small. A spring connection joins the diaphragms. The chamber is filled with substantially incompressible liquid. An application is in temperature compensation. Temperature change results in fill liquid volume change and consequent relieving movement of the large diaphragm, while the small diaphragm remains without movement. External differential pressure change moves both diaphragms and signal output is from movement of the small diaphragm. Application examples are motion systems and force balance systems.

PATENTED AUG 3 1971
3,596,520
SHEET 1 OF 4

*INVENTOR.*
PHILLIP H. SANFORD

INVENTOR.
PHILIP H. SANFORD
AGENT

PATENTED AUG 3 1971 3,596,520

HYPOTHETICAL

*INVENTOR.*
PHILLIP H. SANFORD

BY
*Lawrence H. Poston*

AGENT

SPRING COMPENSATED DIFFERENTIAL PRESSURE CELL

This invention relates to devices which are responsive to differential pressure, such as differential pressure cells in the form of diaphragm assemblies adapted to be used in differential pressure measuring instruments which may indicate, record, or control the differential pressure, or transmit the value of measured differential pressure to other instruments or regulating devices located at remote points; or to be used in other suitable applications wherein pressure differential is a factor. As an illustrative disclosure, this invention concerns itself with temperature compensation for differential pressure cells. Signal takeoff may be in any suitable fashion. Mechanical and electromagnetic forms are shown herein by way of illustration.

A typical differential pressure measuring instrument is disclosed in Bowditch U.S. Pat. No. 2,806,480.

Differential pressure measuring instruments of the type shown in the Bowditch patent comprise a two-part casing having a resilient corrugated metal diaphragm clamped therebetween. The diaphragm divides the interior of the casing into two chambers which communicate respectively with the two pressures between which the difference is to be measured. In a force balance function, the resultant force on the resilient diaphragm is transmitted by a force bar or rod through a flexible portion of the casing wall and the transmitted force is measured externally of the casing by a pneumatic force balancing unit.

In a further development in this art, another U.S. Pat. No. 2,770,258 to Bowditch sets forth a measurement unit in which two diaphragms are used instead of one as above, to form a diaphragm capsule with advantages in the area of overrange and damping problems. This structure comprises a pair of diaphragms, essentially equal in size, with a backup plate between them, a central opening through the backup plate, a closed inner chamber including this central opening and spaces provided between the diaphragms and the backup plate, and a rigid connection between the diaphragms in the inner chamber and through the central opening of the backup plate. In order to transfer the pressure applied to one diaphragm properly to the other the inner chamber is completely filled with a relatively noncompressible liquid, such as silicone oil.

In such a liquid filled diaphragm assembly, change in the temperature of the assembly will cause the volume of the fill liquid to change. Ordinarily, attempts are made to reduce the deleterious effects of this change of volume of the liquid by making the volume of the inner chamber as small as effectively possible, and selecting and mounting diaphragms to obtain substantial identity therebetween in terms of effective area. This invention relates to compensation of such fill volume changes, for example, as caused by temperature changes.

The present invention, accordingly, relates to differential pressure double diaphragm capsules, or cells, of the general nature of that disclosed in the Bowditch U.S. Pat. No. 2,770,258.

In one form, the present invention is concerned with short stroke devices, in the form of a motion balance differential pressure cell. In this application, a range spring and signal pickoff transducer are inserted between the two diaphragms. This requires a relatively large inner chamber and a relatively large quantity of fill fluid, which, with temperature change, can expand and provide high pressures to the capsule. The same pressure acts on each diaphragm, but if the effective areas of the diaphragms are unequal due to manufacturing and/or assembly tolerances, error factor will be introduced.

This invention provides in such a motion balance, short stroke, differential pressure cell, means for obviating the above difficulties by providing a pair of unequal sized diaphragms (different effective areas) and an elongate connection in the inner chamber and between the diaphragms, this connection at least including a spring so that as the distance between the diaphragms is varied by volumetric expansion this spring stretches or compresses producing a balancing force on the smaller diaphragm.

As another form of use of this invention, the differential pressure capsule may be structured as a force balance device like that disclosed in the Bowditch U.S. Pat. No. 2,770,258.

As an example of a motion balance device, a member attached to the smaller of the diaphragms is used to move a core in an electromagnetic pickoff coil. In the illustration herein, this pickoff coil is within the capsule, between the diaphragms, but, with suitable structure changes, it could be outside of the capsule.

As a force balance device, the external output member is attached to the smaller of the diaphragms.

The temperature compensation effect of this invention involves movement of one diaphragm without movement of the other. Thus, the larger diaphragm moves and the connection spring stretches or compresses while the smaller diaphragm remains stationary.

In explanation of this invention, the idea develops in three steps, the first two of which are hypothetical. First, in a fluid motion balance filled cell with two unequal diaphragms no connection is provided between the diaphragms in the sense of a spacer rod within the chamber. The result of temperature increase in this instance is fill volume change and outward movement of both diaphragms, a situation unsuitable to the purpose of this invention.

Second, in a similar fluid cell, but with rigid rod in the inner chamber connecting the diaphragms, the results of temperature increase is movement of both diaphragms in the same direction; outward for the larger diaphragm and inward for the smaller diaphragm. This situation is also unsuitable to the purpose of the invention.

Third, and exemplifying this invention: in a similar fluid cell, with a connection between the diaphragms which is an elongate end-to-end assembly of a rigid rod and a spring, an effect intermediate that of the first and second situations is achieved, and the result of temperature increase is established in that the larger diaphragm moves and the smaller diaphragm does not. For example, with the spring connected to the larger diaphragm and the rigid rod (signal pickoff transducer CORE) connected to the smaller diaphragm, the effect of temperature increases is established to be outward movement of the larger diaphragm, which stretches the connecting spring in amount necessary to prevent motion of the smaller diaphragm. Thus, temperature variant without signal variant, is achieved. In the case of the force balance system, there are no unbalance forces on the smaller diaphragm as a result of temperature change and therefore there is no output force.

It is apparent that a rigid connection between the diaphragms produces an error opposite to that generated by the use of no connection between the diaphragms, and that a connection with some stiffness may be provided as just right for the desired compensation. This connection is a spring.

If the effective area of the smaller diaphragm is made relatively small, the error produced by volumetric expansion without the connecting spring would be of low force level. Hence, the connecting spring required to cancel the error is one of low spring rate. A low spring rate connection between the two diaphragms does not materially oppose the buildup of pressure as the fill liquid expands inside the capsule. Thus the manufacturing and assembly tolerances of the various components are far less critical than typical diaphragm capsule construction prior to this invention.

These objects and advantages, and others of this invention will be in part apparent and in part pointed out hereinafter and in the accompanying drawings, wherein.

Figure 4:
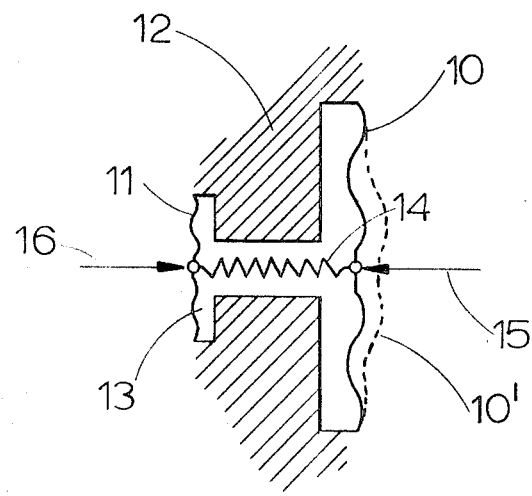
FIG. 4 is a simplified schematic of a pair of diaphragms, spring joined, according to this invention.

Referring to the drawings in more detail, the compensation concept of this invention as related to a differential pressure system, illustrated in FIG. 4, comprises a large diaphragm 10 and a small diaphragm 11, defining, in a body 12, a chamber 13 between the diaphragms and filled, essentially incompressibly, with silicone oil. Within the chamber 13, and mechanically joining the diaphragm is a spring 14. A change in pressure in the fill liquid (oil) as caused by an increase in temperature applied to the fill liquid, results in expansion of the fill liquid and thus the volume of the chamber 13 and consequent movement of the large diaphragm 10, shown by the dotted line 10', indicating the new position of the diaphragm 10.

Motion of the diaphragm to position 10' stretches the spring 14 an amount to just balance the force resulting on diaphragm 11 as a consequence of this pressure change. Thus the smaller diaphragm remains essentially without movement. The differential pressures applied to this system are external and indicated in FIG. 4 as arrows 15 and 16, representing opposing pressures applied externally respectively to diaphragms 10 and 11. Since the fill liquid is essentially incompressible the diaphragms are in effect joined for differential pressure measurement purposes.

Figure 1:
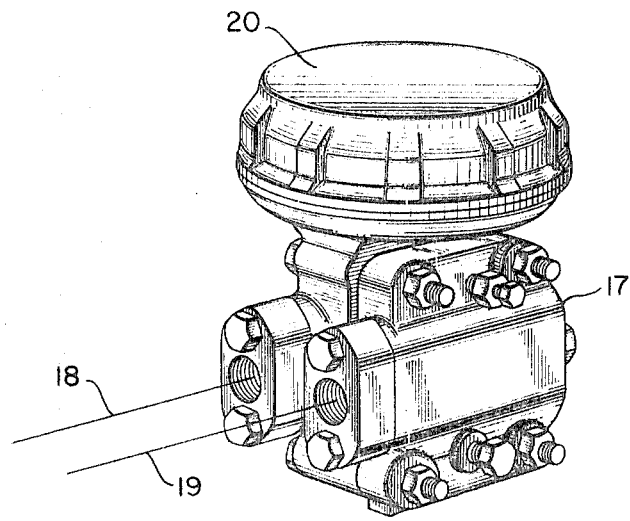
FIG. 1 is a motion balance form of the externals of a differential pressure system embodying this invention.

In FIG. 1, the housing 17 contains a differential pressure system (FIG. 3) according to this invention, with opposing differentially pressure inputs at 18 and 19, with topworks 20 as suitable electronic means for handling the electrical output of this motion balance device.

Figure 2:
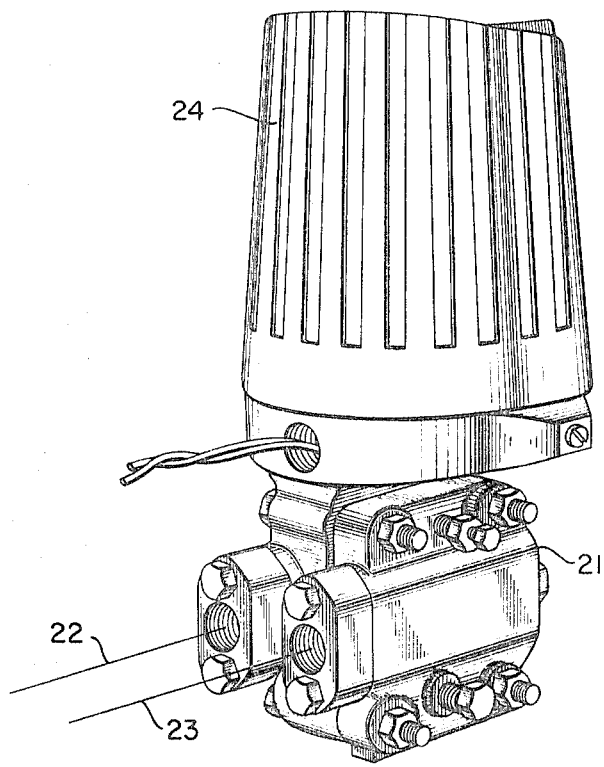
FIG. 2 is a force balance form of the externals of a differential pressure system embodying this invention.

In FIG. 2, the housing 21 contains a differential pressure system (FIG. 7) according to this invention, with opposing differential pressure inputs at 22 and 23, with topworks 24 as suitable (pneumatic or electrical) means for handling the force output of this force balance device.

Figure 3:
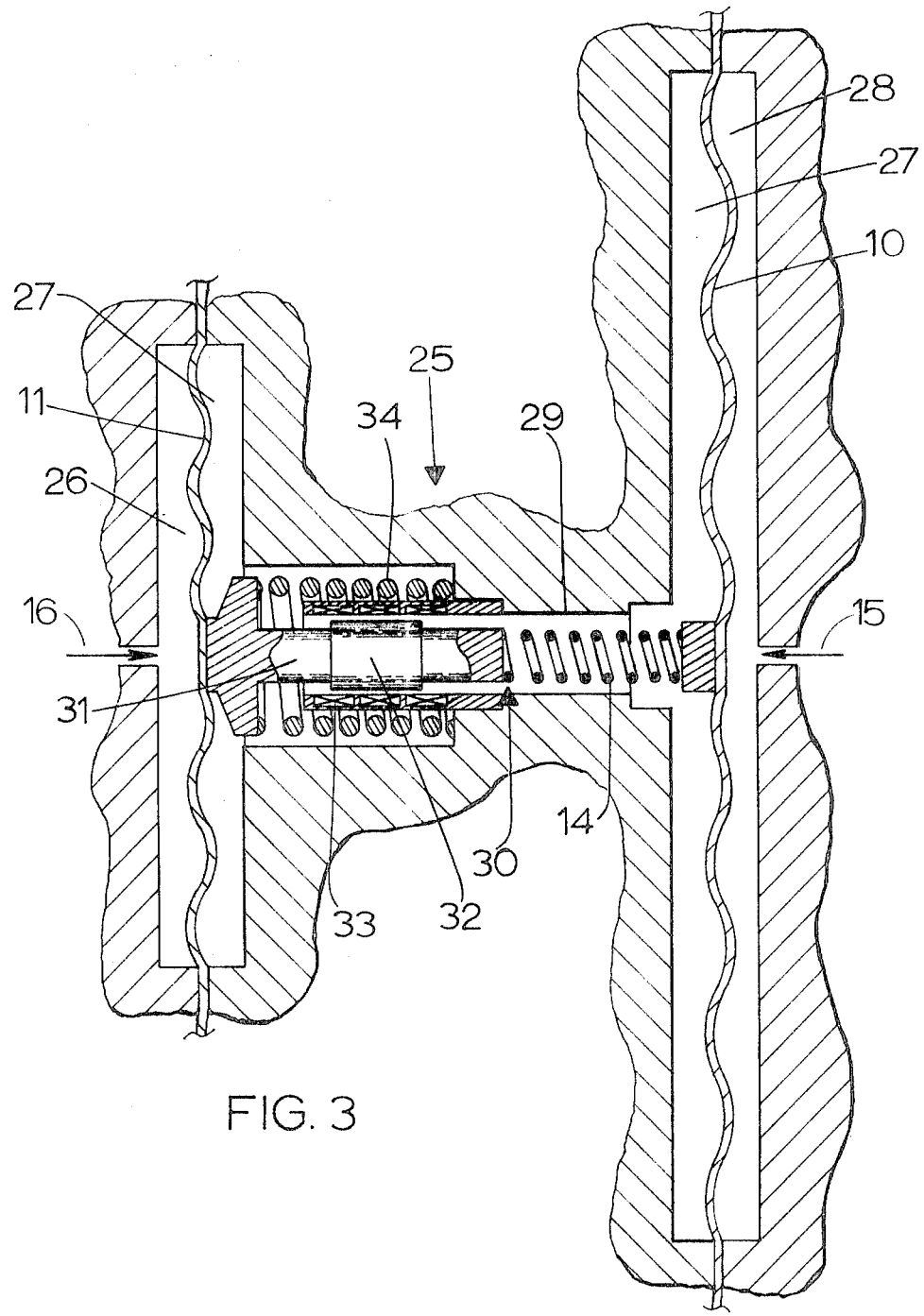
FIG. 3 is a showing of the internal structure of the motion balance system of FIG. 1.

Referring to FIG. 3, the number 25 generally designates the lower casing of a differential pressure transmitter of the type disclosed in the Bowditch U.S. Pat. No. 2,770,258. The casing 25 comprises body portions which are bolted together (not shown) to clamp the small diaphragm 11 and the large diaphragm 10 in the body with that portion of the body between the diaphragms as a backup for the diaphragms. Suitable wave corrugations may be provided, as in the Bowditch U.S. Pat. No. 2,770,258 to seat the diaphragms and match the waveforms of the diaphragms in FIG. 3 at 10 and 11.

The small diaphragm 11 divides a chamber in the body 25 into a high pressure input chamber 26 and into a part of an inner chamber 27, between the diaphragms. In like manner the large diaphragm 10 divides a chamber in the body 25 into a pressure input chamber 28, and another part of the inner chamber 27, between the diaphragms. The remainder of the inner chamber 27 comprises an opening 29 through the backup plate, centrally of the diaphragms.

The diaphragms 10 and 11 are connected by an elongate assembly 30, within the inner chamber 27 and extending through the backup plate opening 29. The assembly comprises a rigid diaphragm 11 and extending into the passage 29, and a coil spring 14, endwise mounted between the free end of the bar 31, within the opening, and the inner face of the large diaphragm 10.

It is customary in double diaphragm capsules, to use rigid standoff connector bars internally of the diaphragms as guides and precision following means as between movements of the diaphragms. In this invention, this standoff connector is invested with a spring function for extension-compression action for the purpose of temperature compensation as applied to temperature effects on the fill liquid between the diaphragms, in this case, in the inner chamber 27, including the opening 29.

Figure 5:
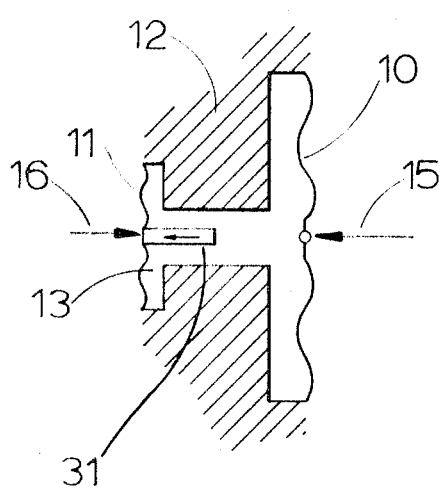
FIGS. 5 and 6 are hypothetical explanatory structure showings leading to understanding of the concept of this invention.
Figure 6:
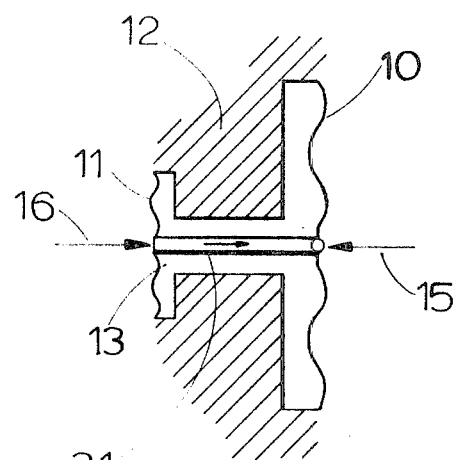

The function and operation of the spring 14 connector between the diaphragms may be considered by reference to the explanatory, hypothetical structure of FIGS. 5 and 6.

In FIG. 5, the effect of temperature increase on the inner chamber fill liquid is seen to be expansion of the fill fluid, and movement of the rigid bar 31 in the direction of the arrow thereon, outwardly in terms of the small diaphragm, when there is no connection of the bar 31 to the large diaphragm 10. Increase of internal pressure will move both diaphragms, and therefore the bar 31 is moved outwardly of the small diaphragm.

In FIG. 6 where there is a rigid connection internally between the diaphragms, and because of the difference in the effective areas of the diaphragms, temperature caused expansion of the fill liquid results in movement of both diaphragms in the direction of the arrow on the bar 31, outwardly of the large diaphragm.

Figure 7:
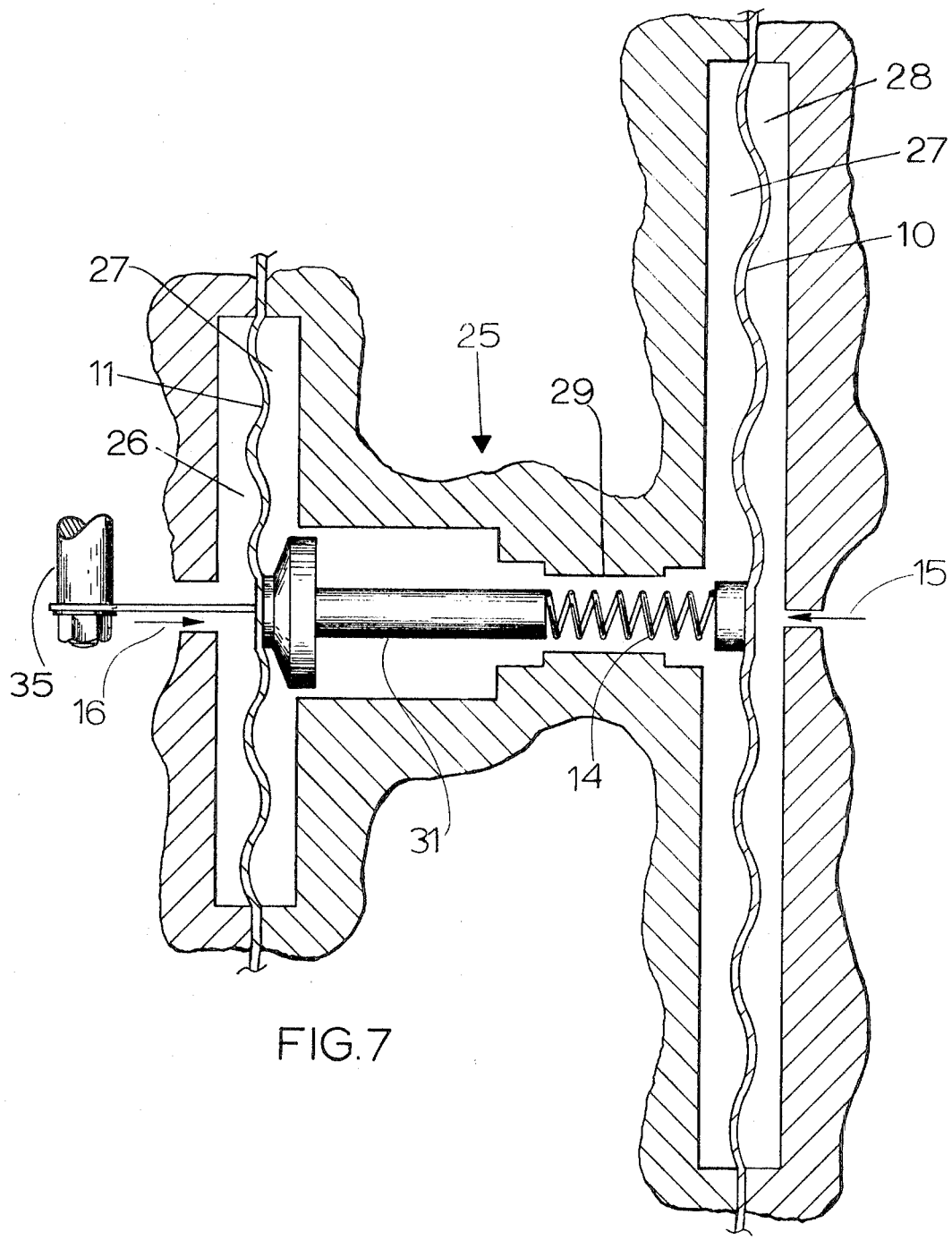
FIG. 7 is a structural showing of a force balance system embodying this invention, comparable to that of FIG. 3 except for the motion balance nature of the FIG. 3 structure.

Accordingly, in this invention, as in FIGS. 3, 4 and 7, wherein the diaphragms are connected by a combination of the bar 31 and the spring 14, temperature caused change of fill fluid volume is controlled as between the effects of the structures of FIGS. 5 and 6.

As in FIG. 3, the bar 31 is provided with a core 32 as part of an electromagnetic signal pickup transducer including electromagnetic coils 33 encompassing the core 32.

A range spring 34 is provided around the signal transducer, based between the body of the backup plate and a shoulder on the rigid bar 31.

The force balance structure of FIG. 7 is similar to the motion balance structure of FIG. 3, with like reference numbers where applicable. The force balance output force is taken from the bar 35, externally secured to the small diaphragm 11 in the matter disclosed in the Bowditch U.S. Pat. No. 2,770,258. Otherwise this structure embodies the concepts and functions of this invention in like manner to those of the structure of FIG. 3, as related to the concept of FIG. 4.

This invention therefore provides a new and useful differential pressure device, with temperature compensation with respect to the effect of temperature on the fill liquid, in terms of a spring connection internally between diaphragms of unequal size.

I claim:

1. A differential pressure system comprising a pair of diaphragms with different effective areas,
a chamber between said diaphragms for containing essentially incompressible fill liquid, and connection means between said diaphragms within said chamber, said connection means at least in part comprising compressible-extensible means whereby the distance between said diaphragms is variable by movement of the one of said diaphragms having the larger effective area without significant movement of the other of said diaphragms, in response to fill pressure change in said chamber.

2. A differential pressure system according to claim 1 in which an output is taken externally from the diaphragm, having the smaller effective area, for use in a force balance system.

3. A differential pressure system according to claim 1 in which an output is taken internally from the diaphragm having the smaller effective area, for use in a motion balance system.

4. A differential pressure system according to claim 1 in which an output is taken from the diaphragm having the smaller effective area, in structure suitable for an application selected from a system of motion balance and a system of force balance.

5. A differential pressure system according to claim 1 in which an output is taken externally from the diaphragm having the smaller effective area, for use in a force balance system, wherein said output is electromagnetic, with a movable core therefore secured to said diaphragm having the smaller effective area.

6. A differential pressure system according to claim 4 as a temperature compensated system wherein said fill pressure change is in terms of temperature change applied to said liquid fill.

7. A two-diaphragm differential pressure cell with internal spring compensation for fill volume change due to temperature change, said cell comprising a support body, two unequal size diaphragms mounted on said support and forming a fill chamber between said diaphragms, and a connection between said diaphragms, centrally thereof and within said chamber, said connections comprising an elongate end-to-end assembly of a rigid rod connected to one of said diaphragms and spring connected between the free end of said rod and the other of said diaphragms, said spring being extendable by increased internal pressure in said chamber as applied to said other of said diaphragms, due to volume increase of fill in said chamber as a result of temperature change.

8. A pressure cell according to claim 7 wherein said rigid rod is connected to the smaller of said diaphragms and said spring is applied to the larger of said diaphragms, whereby volume change of said fill in said chamber results in movement of said larger of said diaphragms and said spring, without significant movement of said rigid rod and said smaller of said diaphragms.

9. A pressure cell according to claim 8 with means for taking off a differential pressure signal in response to movement of said rigid rod.

10. A pressure cell according to claim 9 including a support within said diaphragm chamber, and a range spring based between said support and the smaller of said diaphragms.

11. A pressure cell according to claim 9 wherein said signal takeoff means is electromagnetic, with part of said rigid rod as the movable core of said takeoff.

12. For use in industrial instrumentation in process and/or energy control, a temperature compensated differential pressure cell comprising a support body, two diaphragms of different size mounted in said body and forming a chamber between said diaphragms, a backing plate in said chamber, an opening through said backing plate centrally of said diaphragms, a shaft connected to the smaller of said diaphragms and extending into said backing plate opening, a spring mounted in said backing plate opening and between the larger of said diaphragms and the end of said shaft in said backing plate opening, electrical signal takeoff coils about said shaft, with a portion of said shaft as a moving core therefor, and a range spring mounted between an outwardly facing shoulder of said backing plate and an inwardly facing shoulder of said connection shaft, whereby, upon volume expansion of fill in said chamber due to temperature change, said connection spring will be extended, and the larger of said diaphragms moved outwardly, essentially without movement of the smaller of said diaphragms and consequently essentially without movement of said signal takeoff core.

13. A differential pressure system according to claim 1, wherein said connection means includes a rigid member connected to said diaphragm having the smaller effective area, said compressible-extensible means joining said rigid member and said diaphragm having the larger effective area.

14. A differential pressure system according to claim 13, wherein said compressible-extensible means is a coil spring.